May 27, 1930.  H. J. ALBERS  1,760,620
VEHICLE
Filed Oct. 29, 1928  3 Sheets-Sheet 1
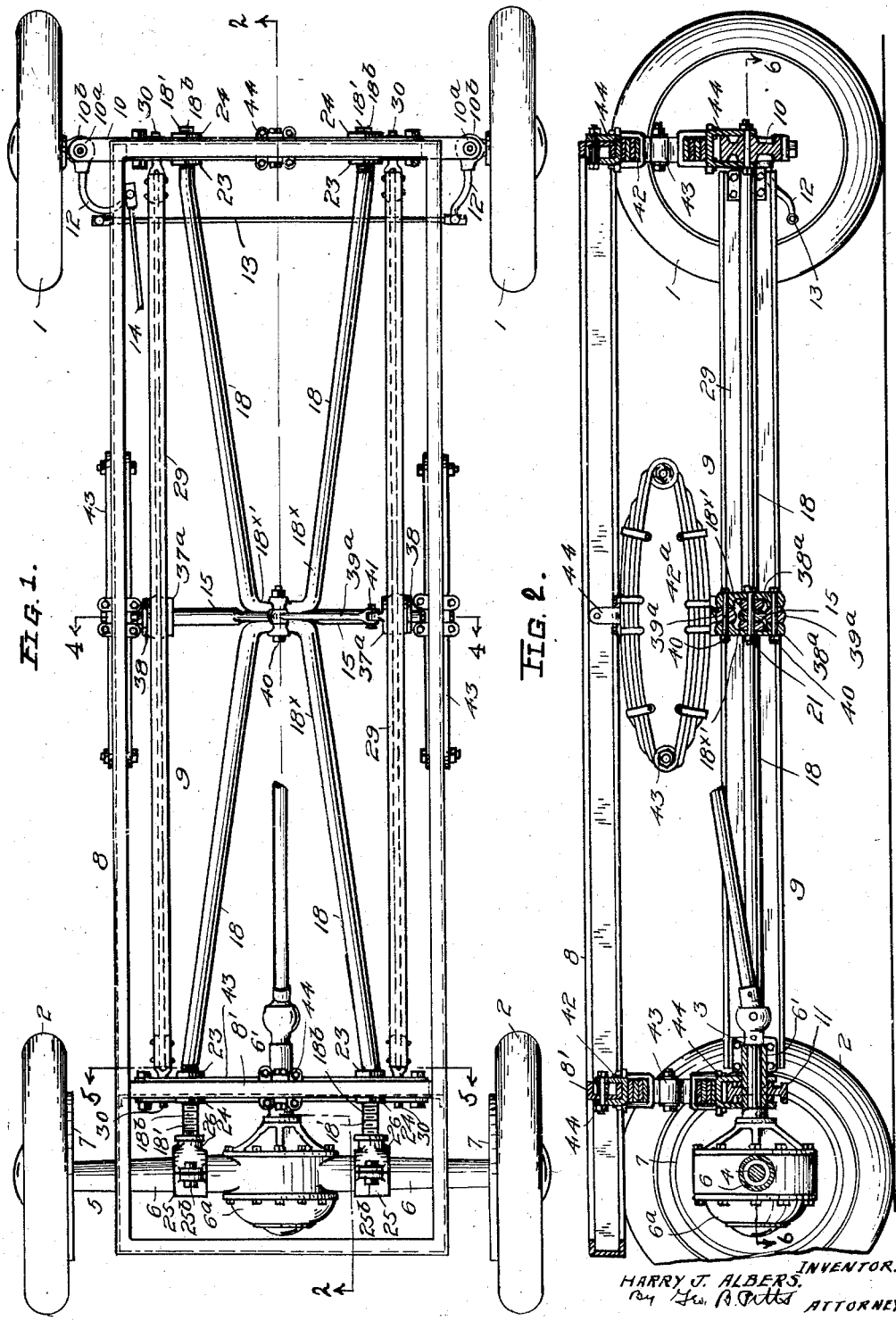
INVENTOR.
HARRY J. ALBERS.
ATTORNEY May 27, 1930. H. J. ALBERS 1,760,620
VEHICLE
Filed Oct. 29, 1928 3 Sheets-Sheet 2

INVENTOR
HARRY J. ALBERS.
BY
ATTORNEY

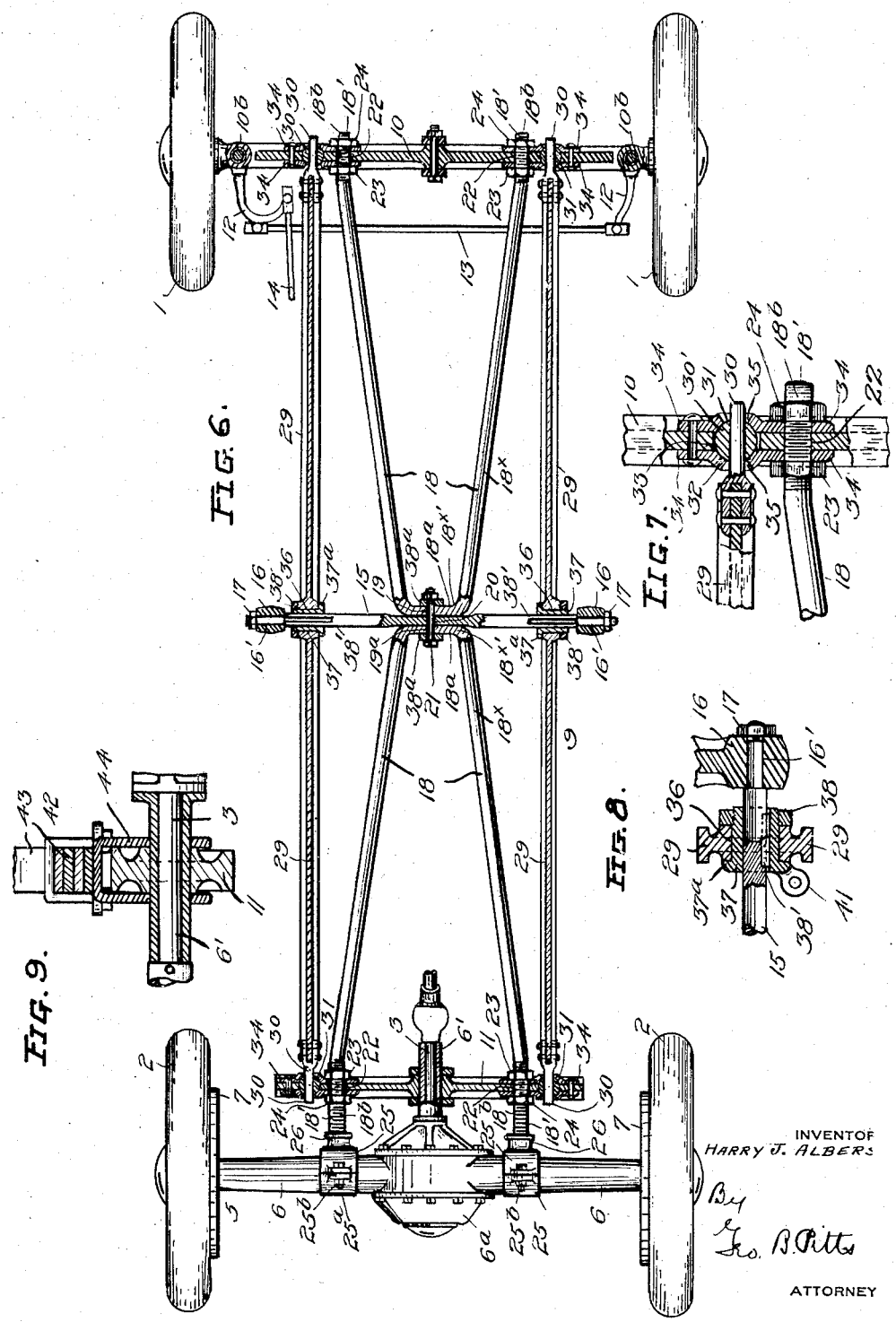

Patented May 27, 1930

1,760,620

UNITED STATES PATENT OFFICE

HARRY J. ALBERS, OF CLEVELAND, OHIO

VEHICLE

Application filed October 29, 1928. Serial No. 315,789.

This invention relates to a vehicle, more particularly to a suspension mechanism or running gear or mounting for the body or load-carrying frame.

One object of the invention is to provide an improved suspension mechanism or running gear capable of equalizing or absorbing shocks resulting when the wheels ride uneven surfaces and maintaining greater stability of the frame which carries the body portion or load.

Another object of the invention is to provide an improved construction of running gear which so connects the axles of the pairs of wheels together that either thereof may move upwardly and downwardly when running over an unevenness without unduly affecting the stability of the frame which carries the body portion or load carrying portion.

Another object of the invention is to construct a vehicle having an improved running gear capable of reducing vibrations and preventing undue tilting or lateral displacement resulting when the wheels encounter unevenness of the ground or surface over which the vehicle runs.

Figure 3:
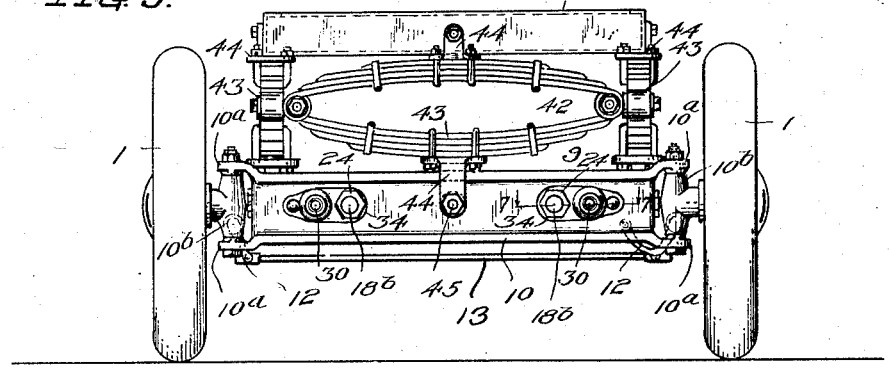
Figure 4:
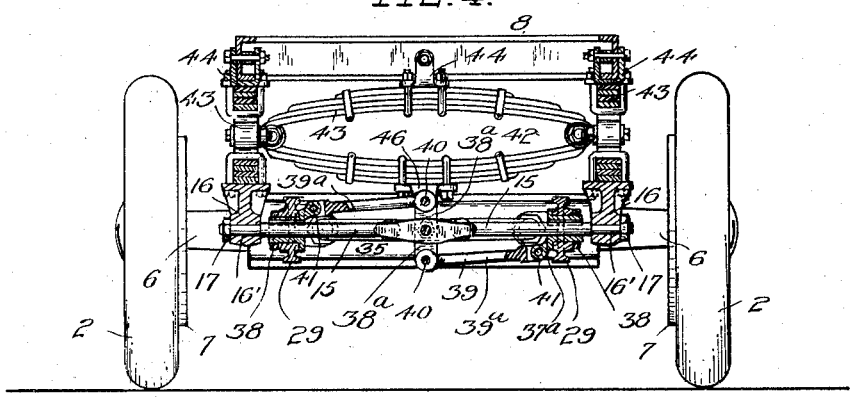
Figure 5:
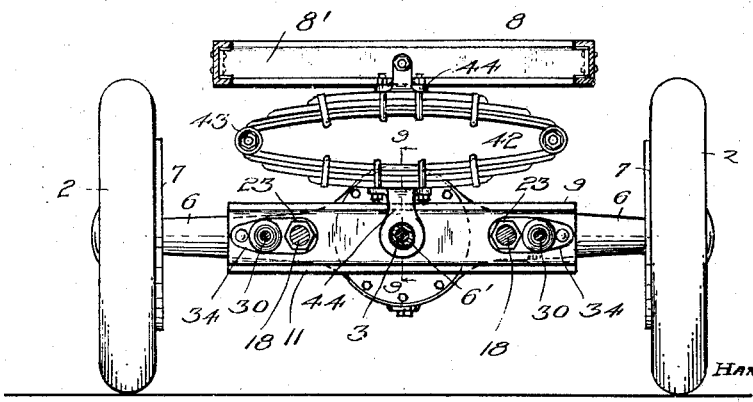

Other objects of the invention will be apparent to those skilled in the art to which my invention relates from the following description taken in connection with the accompanying drawings, wherein Fig. 1 is a plan view of a vehicle embodying my invention, parts thereof being omitted.
Fig. 2 is a section on the line 2—2 of Fig. 1.
Fig. 3 is a front elevation.
Fig. 4 is a section on the line 4—4 of Fig. 1.
Fig. 5 is a section on the line 5—5 of Fig. 3.
Fig. 6 is a section on the line 6—6 of Fig. 2.
Fig. 7 is a fragmentary section, enlarged, on the line 7—7 of Fig. 3.
Fig. 8 is a fragmentary section of portions shown in Fig. 4, enlarged.
Fig. 9 is a fragmentary section on a line 9—9 of Fig. 5.

In the drawings, 1, 2, indicate pairs of wheels. Either or both said pairs of wheels may be steerable, but by preference one pair only is utilized for steering and the other pair is driven. For convenience, but without the intention of limiting the invention, the steerable wheels may be considered the front wheels and the wheels 2 the rear wheels. The wheels 2 are herein shown as driven by a suitable power transmitting mechanism of the differential type, driven in a well known manner by a propeller shaft 3, the latter being connected to the shaft of a suitable engine or motor (not shown). The power transmitting mechanism is connected to the live axle sections 4 (see Fig. 2), which in turn are connected to the wheels 2. The axle sections 4 are mounted in the axle 5 consisting of housing members 6, 6, connected to an intermediate housing 6ª in a well known manner, the latter housing serving to enclose the power transmitting mechanism. 7 indicates suitable brake drums fixed to the wheels 2.

8 indicates a main frame or chassis. The frame 8 serves to support (a) the body of a passenger vehicle or the platform or other support where the vehicle is to be used for transporting loads of material and (b) the power unit where one or both pairs of wheels are driven; but as these parts form no part of my invention, they are not illustrated. In the present illustrated form of construction, the main frame is shown as of rectangular form, but it may be of any desired form, as circumstances may dictate.

9 indicates as an entirety a suspension mechanism or running gear interposed between the main frame 8 and the wheels 1, 2, and comprising relatively movable elements which (a) permit relative bodily movement of the wheels when entering depressions or riding obstructions without effecting undue tilting or lateral displacement of the frame 8, and (b) absorb shocks and bouncing reactions due to uneven conditions of this sort; the result being that in passenger vehicles riding is made easier and in load carrying vehicles jarring and danger of tilting is materially reduced or substantially eliminated.

Of the suspension mechanism 9, 10 and 11 indicate transverse axle members, the former forming the axle for the front wheels 1 and the latter being rigidly connected to the housing members 6 (in the manner to be later set forth), whereby the axle member 11 and axle 5 move as a unit when either wheel 2 accommodates itself to an unevenness in the surface, as already set forth.

The axle member 10 carries at its opposite ends spaced knuckles 10$^a$ between which the wheel knuckles 10$^b$ are pivotally mounted in the usual manner. The wheel knuckles are provided with arms 12, connected by a tie rod 13; one arm being connected by a rod 14, which in turn is connected to and operated by a steering wheel or lever (not shown).

When the wheels 2 are not to be driven the axle 5 may be omitted; in this form of construction the wheels 2 would be mounted at the opposite ends of the axle member 11; when so mounted, they may be knuckle mounted for steering purposes in a manner similar to the mounting for the wheels 1, or non-steerably mounted in any well known manner. In such embodiment of my invention, the vehicle may well serve as a trailer or hand truck for transporting loads. 15 indicates a transversely extending, intermediate member, preferably arranged substantially midway between the axle members 10, 11. The member 15 pivotally carries at its opposite ends suitable supports or seats 16, constituting parts of certain connecting devices to be later referred to. For this purpose, each end of the member 15 is reduced to form a pin 16' and a shoulder (see Figs. 4 and 8) and the lower portion of the adjacent support 16 is formed with an opening to receive the reduced end, the support 16 being pivotally or rotatably held on the reduced end and against the shoulder by a nut 17. 18 indicates combined radius and connecting devices extending between the axle members 10, 11, and the intermediate member 15, and pivotally connected to the latter to relatively move about a longitudinal axis, preferably disposed centrally of the vehicle, whereby the axle members 10, 11, may trunnion about such axis, one relative to the other. The radius devices at either side of the intermediate member 15 are in converging relation and by preference are formed from a single section 18$^x$ of material, such as suitable bar material, bent into substantially V-shape, the free or outer ends 18$^b$ of the V-shaped section 18$^x$ being rigidly, but adjustably connected to the adjacent axle member and the inner portion thereof having a transverse section 18$^{x'}$ that is flattened, as shown at 18$^a$ in Figs. 1 and 6, to provide a bearing surface to engage a flattened portion on the member 15. The central portion 18$^{x'}$ at the inner end of each section 18$^x$ is formed with an opening 19 which registers with an opening 19$^a$ formed in the central portion 18$^{x'}$ of the other section 18$^x$ and with an opening 20 formed in the intermediate member 15 to receive a pivot pin 21, preferably comprising a bolt held in position by a nut. In the form of construction just described each radius section 18$^x$ and the adjacent axle member being rigidly connected swing as a unit about the axis 21 where one of the adjacent wheels rides an uneven surface or both said wheels ride uneven surfaces extending from the normal plane different distances. The adjustable connections for the outer ends 18$^b$ of each section 18$^x$ may be provided by forming thereon screw threads 18' and extending such ends through openings 22 formed in the axle member 10 or 11 and then tightening the nuts 23, 24, on such ends against the opposite faces of the adjacent axle member. By preference, the outer ends 18$^b$ of the section 18$^x$, that are connected to the axle member 11, are utilized to connect the housing members 6, which constitute the rear axle proper, thereto. For this purpose, I provide upon the members 6 pairs of semi-circular clamping devices 25, 25$^a$, each pair having lugs that are secured together by bolts 25$^b$ to clamp the devices to the adjacent housing member 6. The inner clamping devices 25 are provided with hollow bosses 26 having internally threaded walls, whereby the bosses 26 may be threaded onto the free ends 18$^b$ of the section 18$^x$. To provide for this form of construction, the threaded ends 18$^b$ of the section 18$^x$ are extended, as shown in Figs. 1 and 6. This arrangement, simplifies and reduces the number of parts for connecting the axle 5 to the axle member 11, where the wheels 2 are to be driven and permits the axle to be readily adjusted to the desired distance from the axle member. The extended ends may carry nuts 27 which may be tightened against the end walls of the bosses 26. When the axle member 11 and rear axle 5 are connected together in this manner, the inner side wall of the housing 6$^a$ may be provided with an inwardly extending tubular section 6' that extends through an opening in the axle member 11 and this tubular section may be provided with suitable bearings to support the propeller shaft 3. 29, 29, indicate a pair of relatively rigid, truss members extending longitudinally of the vehicle and disposed in parallel relation, and each rotatably and pivotally and also slidably connected at its opposite ends to the axle members 10, 11. As shown, the truss members 29 are disposed outwardly of the radius devices 18 so that said members and devices may freely operate without interference when tilting or trunnioning of the axle members 10, 11, or either thereof, takes place due to the wheels 1, 2, riding uneven surfaces.

Intermediate their ends, the truss or longitudinal members engage the opposite outer portions of the intermediate member 15 to support it in position at right angles to the axis of the pivot 21, being preferably connected thereto in a manner to prevent movement of either end of said latter member in a direction toward either end of the vehicle.

The longitudinal members 29 may be of any desired construction to give them strength and rigidity. The connection at each free end of each member 29 comprises a shaft or pin 30 extending from such end and rotatably and slidably fitting an opening 30' formed in a ball 31, which in turn rotates in a socket 32 carried by the adjacent axle member, the ball and socket constituting a universal joint and the opening in and through the ball permitting the pin 30 to slide endwise and rotate therein. Each socket 32 is provided by forming an opening 33 in the adjacent axle member and securing to the opposite faces of the member plates 34 having pressed out portions forming opposed concave walls in juxtaposition to the opening 33, as shown in Fig. 7. The concave walls are formed with aligned openings 35 to accommodate the pin 30. It will be understood that when any of the wheels move upwardly or downwardly, in passing over an unevenness, the adjacent axle member tilts relative to the other axle member and carries with it the near end of the adjacent longitudinal member 29. During such relative tilting movement, the axle members 10, 11, are maintained in substantially parallel relation by the radius devices 18, whereas the longitudinal member 29 connected to that end of the axle member that is tilted, assumes a position inclined to the horizontal, the pivotal connections between said longitudinal member and the axle members 10, 11, permitting these parts to articulate in this manner, and the elongated pin 30 and opening 30' therefor in the ball permitting of the relative angular movement between the longitudinal member and axle member as well as compensating for the increased distance between the corresponding ends of the axle members when one of the latter tilts. The pins 30 are relatively long to permit of maximum relative tilting movement of the axle members 10, 11.

The connections between the outer portions of the intermediate member 15 and the truss members are preferably combined with an equalizing means, indicated as an entirety at 35, which maintain the central portions of the truss members 29 equal distances from the axis of the pivot pin 21 during relative tilting movements of the axle members 10, 11. In carrying out this preferred form of construction, I form in the truss members aligned openings 36 through which the opposite ends of the intermediate member extend.

To provide for a connection of the equalizing means with the truss members, I mount in each opening 36 a bushing or sleeve 37, having a flange 37$^a$ at one end and carrying a nut 38 at its other end arranged to engage the adjacent face of the truss member to lock the bushing against endwise movement in the opening 36, but permitting rotative movement of the truss member on the bushing due to the swinging or rocking of the truss member, when either or both axle members 10, 11, tilt. As shown, the outer portions of the intermediate member extend through the bushing for support by the truss members 29 and the bushings slide on such outer portions when the equalizing means operate to maintain the truss members equal distances from the pin 21. To prevent rotation of the bushing 37, each is formed with a slot or groove and the adjacent portion of the member 15 carries a key 38' fitting into said slot or groove.

The equalizing means 35 also include a rocker 38$^a$ trunnioned intermediate its ends on the pivot pin 21 and a linkage 39 between one of its ends and one of the sleeves or bushings 37 and a similar linkage between its other end and the other sleeve or bushing. The rocker may comprise a pair of bars 38$^a$ disposed on the pin 21 outwardly of the central portions 18$^{x'}$ and connected in aligned relation at their ends by bolts 40, and each linkage 39 may consist of a link 39$^a$ pivoted at its inner end on one of the bolts 40 and pivotally connected at its outer end to a lug 41 extending from the inner end of the adjacent sleeve 37. As more clearly shown in Fig. 4, the linkages 39, 39, are connected to the opposite ends of the rocker 38, so that a thrust or a pull movement through one link 39 will effect a movement in the opposite direction on the other link, whereby the truss members 29 will be maintained equal distances from the pin 21 at all times and any tendency of the intermediate member 15 to move endwise in either direction, due to trunnioning of the axle members about the pivot 21 or tilting of either thereof or due to thrusts in a longitudinal direction, for example, thrusts incident to the resistance of either wheel in meeting with an obstruction, is entirely overcome or counteracted. By constructing the rocker 38$^a$ as above described, it disposes the links 39 in line with the intermediate member 15 and with each other.

42, 42$^a$, indicate devices between the suspension mechanism 9 and the frame 8, serving to connect the latter to the suspension mechanism and to support it thereon, these devices being co-operable with such mechanism to permit the latter to operate effectively. I provide a connecting device 42 between each end bar of the frame 8 and the adjacent axle member 10 or 11 and also, by preference, I provide a connecting device 42$^a$ between each side bar of the frame 8 and the adjacent outer end of the intermediate member 15. Where the rear end of the frame 8 extends over the axle 5, the frame 8 is provided with a supplemental end bar 8' in alignment with the axle member 11, and the adjacent connecting device 42, is connected to this bar 8'. The upper ends of the connecting devices 42, 42$^a$, are preferably rigidly connected to the frame 8;

whereas the lower ends of said devices are pivotally connected to the suspension mechanism 9, the pivots between the lower ends of the connecting devices 42, 42, and the axle members 10, 11, being in axial alignment with the pin 21 and the pivots for the lower ends of the connecting devices 42ᵃ, 42ᵃ, which pivots consist of the outer end portions of the intermediate member 15, being in axial alignment with the latter, so that the frame 8 is connected to the suspension mechanism 9 on centrally disposed longitudinal and transverse axes that are co-incident to the longitudinal and transverse axes for the axle members 10, 11, and truss members 29. As a result of this arrangement, the suspension mechanism 9 operates to compensate for the relative up and down movements of the several wheels when engaging and riding uneven surfaces, thereby equalizing such movements, reducing vibrations or rebounds on the frame and providing for greater stability against lateral displacement. The devices 42, 42ᵃ, may consist of full elliptic leaf springs 43 which tend to cushion the frame 8. The upper section of each spring is rigidly connected to a seat-member 44, which in turn is rigidly fixed to the frame 8; whereas the lower section of each spring is clamped to a support; for example (a) the lower section of each device 42 is clamped in a well known manner to an inverted U-member 44 which straddles the adjacent axle member and is pivoted thereto by a bolt 45, the U-member 44 for the rear axle member 11 being pivoted on the tubular section 6′ since the propeller shaft 3, for well known reasons, is in axial alignment with the pivot 21; and (b) the lower section of each device 42ᵃ is clamped to a seat or support 16, which is pivoted on the member 15 as already set forth.

From the foregoing description it will be understood that my improved suspension mechanism permits any one or more or all of the wheels to ride uneven portions in the surface whether they extend above or below the normal plane or level of such surface; that is, the mechanism permits the wheels to singly or simultaneously engage such surfaces without imparting strains on the correlated members thereof or the main frame; also, as the truss members are trunnioned on a central transverse axis and the axle members are trunnioned on a longitudinal axis and the frame 8 is connected to the suspension mechanism on the same axes, it will be seen that either pair of wheels or the wheels at either side of the frame may simultaneously ride an obstruction and a recess respectively without affecting the stability of the frame 8; where any two wheels, as just set forth, simultaneously ride two obstructions or two recesses but of different vertical dimensions the effect on the frame 8 will be approximately one-half the difference between such vertical dimensions due to the fact that the wheels tilt or trunnion on an axis located between them. Where only one wheel rides an unevenness, the members of the suspension mechanism accommodate themselves thereto in the same manner to maintain the frame 8 substantially stable or level. My construction is also advantageous for use where either or both pairs of wheels are driven as it enables them to engage the surface at all times to thus insure continuous tractive effort.

To those skilled in the art to which my invention relates, many changes in construction and widely differing embodiments and applications of the invention will suggest themselves without departing from the spirit and scope thereof. My disclosures and the description herein are purely illustrative and not intended to be in any sense limiting.

What I claim is:

1. In a vehicle, the combination of a main frame, pairs of supporting wheels, axle members connected to said pairs of wheels, respectively, means for connecting said axle members together to trunnion about a longitudinal axis, a transverse intermediate member, and a connecting device between each end of said frame and the adjacent axle member and pivotally connected to the latter on an axis coincident with the axis of said trunnion, and a connecting device between each side of said frame and the adjacent outer portion of said intermediate member and pivotally connected to the latter on a transverse axis, said pivot connections for said devices serving as the sole connections between them and said axle members and intermediate member.

2. In a vehicle, the combination of a main frame, pairs of supporting wheels, axle members connected to said pairs of wheels, respectively, means for connecting said axle members together to trunnion about a longitudinal axis, a transverse intermediate member, and a spring between each end of said frame and the adjacent axle member, each spring being fixed to said frame end and pivotally connected to the axle member on an axis coincident with the axis of said trunnion, and a spring between each side of said frame and the adjacent outer portion of said intermediate member, each said last referred to spring being fixed to said frame side and pivotally mounted on said intermediate member, said pivot connections for said springs serving as the sole connections between them and said axle members and intermediate members.

3. In a vehicle, the combination of a main frame, pairs of supporting wheels, axle members connected to said pairs of wheels, respectively, means for connecting said axle members together to trunnion about a longitudinal axis, rigid truss members connected to and extending directly between corresponding end portions of said axle members, a transverse intermediate member supported at its opposite ends by said truss members, and connecting devices between said frame and said axle members and between the opposite sides of said frame and said intermediate member, the devices between the opposite ends of said frame and axle members being pivoted to the latter on an axis co-incident with the axis about which said axle members trunnion and the other devices being pivoted on said intermediate member.

4. In a vehicle, the combination of a main frame, pairs of supporting wheels, axle members connected to said pairs of wheels, respectively, means for connecting said axle members together to trunnion about a longitudinal axis, rigid truss members connected to and extending directly between corresponding end portions of said axle members, a transverse intermediate member supported at its opposite ends by said truss members, connecting devices between the opposite ends of said frame and said axle members and between the opposite sides of said frame and said intermediate member, the devices between said frame and axle members being pivoted to the latter on an axis co-incident with the axis about which said axle members trunnion and the other devices being pivoted on said intermediate member, and equalizing means between the trunnion for said connecting means and said truss members.

5. In a vehicle, the combination of a main frame, pairs of supporting wheels, axle members connected to said pairs of wheels, respectively, means for connecting said axle members together to trunnion about a longitudinal axis, a transverse intermediate member, connecting devices between said frame and said axle members and between the opposite sides of said frame and said intermediate member, the devices between said frame and axle members being pivoted to the latter on an axis co-incident with the axis about which said axle members trunnion and the other devices being pivoted on said intermediate member, and truss members outwardly of said connecting means and extending between said axle members for supporting said transverse intermediate member, each said truss member being pivotally connected at its opposite ends to said axle members.

6. In a vehicle, the combination of a main frame, pairs of supporting wheels, axle members connected to said pairs of wheels, respectively, means for connecting said axle members together to trunnion about a longitudinal axis, a transverse intermediate member, connecting devices between the opposite ends of said frame and said axle members and between the opposite sides of said frame and said intermediate member, the devices between the opposite ends of said frame and said axle members being pivoted to the latter on an axis co-incident with the axis on which said axle members trunnion and the other devices being pivoted on said transverse member, and truss members between said axle members for supporting said transverse intermediate member, each said truss member being pivotally and slidably connected to said axle members.

7. In a vehicle, the combination of a main frame, pairs of supporting wheels, axle members connected to said pairs of wheels, respectively, means for connecting said axle members together and trunnion about a longitudinal axis, a transverse intermediate member, connecting devices between the opposite ends of said frame and said axle members and between the opposite sides of said frame and said intermediate member, the devices between the opposite ends of said frame and said axle members being pivoted to the latter on an axis co-incident with the axis on which said axle members trunnion and the other devices being pivoted on said transverse member, and truss members between said axle members for supporting said transverse intermediate member, each said truss member being pivotally and slidably and rotatably connected to said axle members.

8. In a vehicle, the combination of a main frame, pairs of supporting wheels, axle members connected to said pairs of wheels, respectively, radius members extending inwardly from said axle members, means for pivotally connecting said radius members together to permit said axle members to tilt one relative to the other, a transverse intermediate member, and connecting devices between said frame and said axle members and between the opposite sides of said frame and said intermediate member, the devices between the opposite ends of said frame and axle members being pivoted to the latter on an axis co-incident with the axis about which said axle members trunnion and the other devices being pivoted on said intermediate member.

9. In a vehicle, the combination of pairs of wheels, axle members connected to said pairs of wheels respectively, pairs of radius members each rigidly connected at their outer ends to one of said axle members and connected together at their inner ends to trunnion about a central longitudinal axis, a transverse member pivoted on said trunnion connection, and rigid truss members outwardly of said radius member pivotally connected at their ends to said axle members and trunnioned intermediate their ends on said transverse member.

10. A vehicle as claimed in claim 9 in which means are provided for maintaining the central axis midway between said truss members during relative movement between said axle members.

11. In a vehicle, the combination of pairs of wheels, axle members connected to said pairs of wheels, respectively, pairs of radius members each rigidly connected at their outer ends to one of said axle members and connected together at their inner ends to trunnion about a central longitudinal axis, a transverse member pivoted on said trunnion connection, and rigid truss members outwardly of said radius members pivotally connected at their ends to said axle members and trunnioned intermediate their ends on said transverse member, a supporting frame above said connecting members, and supporting devices for said frame pivoted on axes co-incident to said longitudinal axis and transverse axis, respectively.

12. In a vehicle, the combination of a main frame, pairs of wheels, axle members connected to said pairs of wheels, respectively, V-shaped radius members each having its free ends connected to one of said axle members, an intermediate member between the inner portions of said radius members and carrying a central, longitudinal pivot on which said radius members trunnion, truss members supported at their ends by said axle members for supporting the outer portions of said intermediate member, equalizing means between said pivot and said truss members for maintaining them equal distances from said pivot, a pair of supporting devices for said main frame pivoted on said axle members on an axis co-incident with said pivot, and a separate pair of supporting devices for said main frame pivoted on said intermediate member.

In testimony whereof, I have hereunto signed my name.

HARRY J. ALBERS.